Patented June 23, 1942

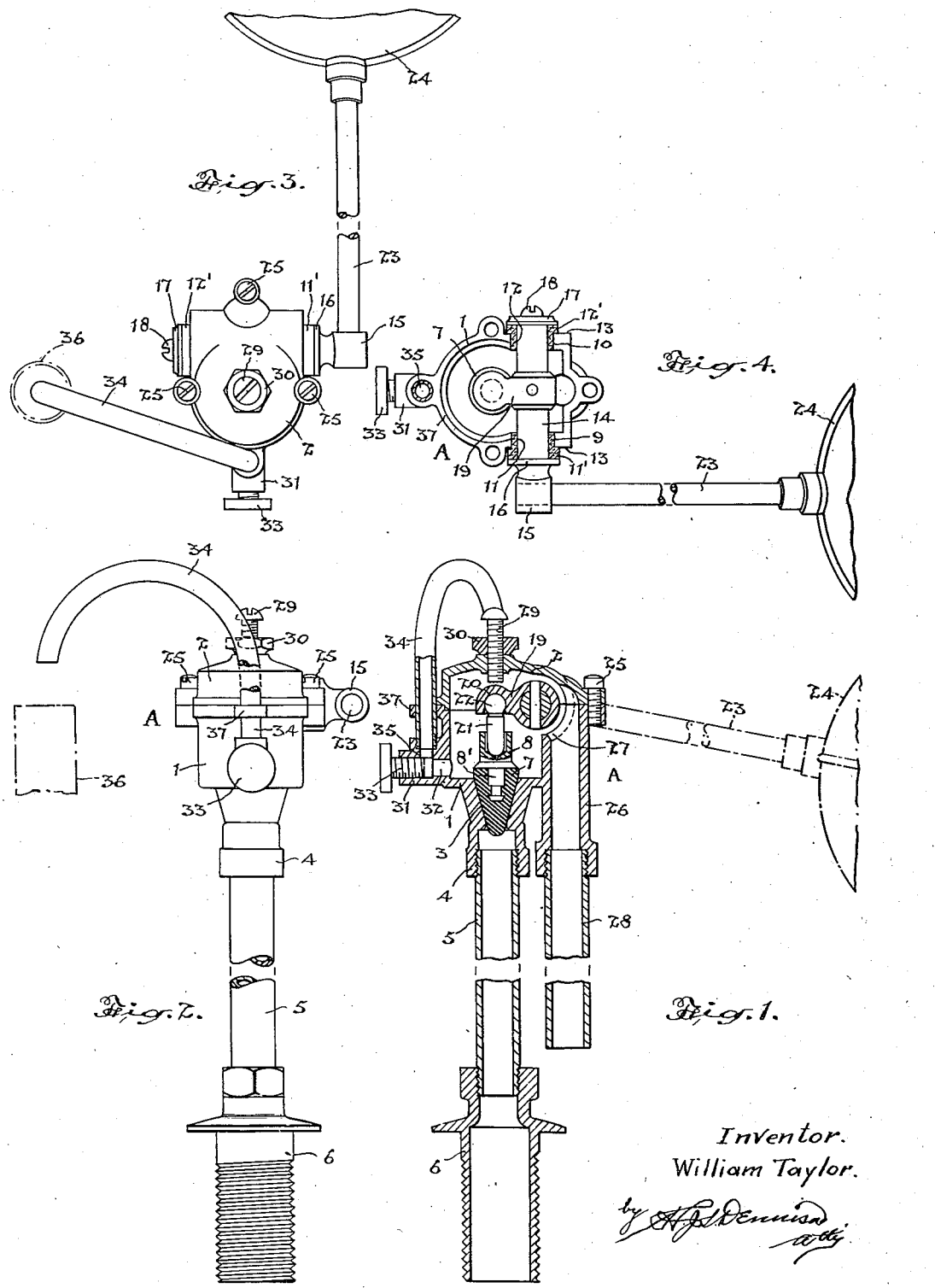

2,287,150

UNITED STATES PATENT OFFICE 2,287,150

FLOAT VALVE

William Taylor, Peterboro, Ontario, Canada

Application August 23, 1940, Serial No. 353,853

3 Claims. (Cl. 137—104)

The principal object of this invention is to provide an improved form of float valve construction which will effectively prevent the siphoning of the water from the tank back into the water main in the event of a "shut down" in the main, thereby obviating the contamination of the water supply.

A further and important object is to devise a valve of simple and compact form which will eliminate close sliding fits and will be free from detrimental corrosive action and will function in a free and dependable manner.

The principal feature of the invention resides in the provision of a tapered valve loosely mounted in a tapered valve-guiding seat in the inlet passage and the arrangement of a float-actuated rock-shaft having a flexible extension to engage the valve to force it into closing contact with the valve seat to close against the inflow.

A further and important feature resides in the construction of the valve housing in separable sections having therebetween bearing sockets for the reception of non-corrosible rock-shaft bearings whereby the machining and assembly of the operating parts is greatly facilitated.

In the drawing, Figure 1 is a mid-sectional elevational view of a float-controlled valve constructed in accordance with the present invention.

Figure 2 is a side elevational view at right angles to Figure 1.

Figure 3 is a plan view of Figure 2.

Figure 4 is a plan view turned at right angles to Figure 3 with the upper section of the valve casing removed and showing the bearing sleeves in section.

In the manufacture of float valves, such as used in flush tanks, it is customary to directly connect the float with the valve which is slidably mounted in a guide way, through a rocking arm or complicated form of linkage, and it is found in practice that due to corrosive action between the valve and relatively closely fitting parts and due to the development of wear between the interlinked elements the valve fails to respond in its expected function, causing considerable inconvenience and involving expensive repairs from time to time. Further such valves cannot be depended upon to close automatically in the event of a vacuum occurring on the inlet side of the valve and the water in the tank is siphoned into the main.

The present invention has been devised to overcome the above difficulties and to provide a valve structure which will operate at maximum efficiency indefinitely.

Referring to the form of construction illustrated, I provide a hollow valve casing A formed of a lower section 1 and mating upper section 2 forming a closure therefor. The section 1 is provided with a long tapered seat 3 converging to a sleeve portion 4 for the reception of a water supply tube 5, the lower end of the tube 5 having a clamping sleeve 6 connected therewith.

A valve member 7 of elongated tapering form to be guided by and to fit the seat 3 is provided with a socketed upper portion 8 and in the preferred construction the tapered body portion 7 is formed of a relatively soft non-corrodible material, such as rubber, moulded around and interlocked with an extension 8' of the socketed portion 8, which is preferably of metal. With this form of valve and seat, the moment the closure pressure is removed from the valve the water pressure lifts the valve and the valve and seat clear each other instantly, consequently close fits and tolerances do not have to be considered.

The casing A is bored transversely in offset relation to the axis of the valve seat to form bearing sockets 9 and 10 which extend partly into the section 1 and partly into the section 2, forming in effect a split bearing. Bearing sleeves 11 and 12 are fitted into the bearing sockets 9 and 10 and are formed with annular shoulders 11' and 12' adapted to bear against the outer flat faces 13 of the casing in positioning and sealing contact.

The bearing sleeves 11 and 12 are formed of fibre or other non-metallic and non-corrodible material which may be economically moulded accurately to form. A rock shaft 14, arranged transversely of the casing A, is oscillatably mounted in the sleeves 11 and 12. The shaft 14 is formed with an eye 15 at one end and has a flange 16 overlapping the outer end of the bearing 11 in positioning and sealing relation, and the opposite end of the shaft has a disc 17 secured thereto by the screw 18 so that it overlaps the outer end of the bearing 12 in sealing and positioning contact.

The shaft 14 carries a lateral arm extension 19 which may be formed separate from or integral with the shaft and this arm is provided with a downwardly facing socket 20. A pin 21 is provided with a ball-shaped upper end 22 universally secured in the socket 20 and the lower end of the pin extends loosely into the socket of the valve member 8. The lower end surface of the pin 21 is preferably rounded and the bottom surface of the socket of the member 8 converges to the axis of the valve so that there will be a self-centering action when the rock shaft is rotated to press the valve to its seat.

A float arm 23 is secured in the eye portion 15 of the shaft 14 and carries a float 24 which when raised by the level of water in the tank in which the valve is placed, operates the rock shaft to close the valve. If when the valve is opened by the lowering of the float, the water pressure on the inlet has for any reason been removed, the valve remains closed by gravity and siphoning of the contents of the tank is prevented.

In assembling the parts referred to it will be apparent that with the valve 7 inserted in place the complete assembly, including the shaft 14, arm 19, pin 21, bearing sleeves 11 and 12, and the float arm 23 and float 24, may be dropped into place as a complete unit, after which the upper or cap section 2 of the casing may be placed in position and secured to the section 1 by the clamping screws 25, thus enabling a very simple and inexpensive assembly operation.

The casing section 1 is formed with a downwardly extending tubular outlet 26 having its entrance end 27 adjacent the upper end of the casing A so that there will be a body of water trapped about the upper end of the valve body 7 when the valve is closed. A discharge tube 28 is connected with the lower end of the tubular portion 26.

A stop screw 29 having a lock nut 30 thereon is adjustably threaded into the upper end of the casing section 2 to engage the arm 19, whereby the opening movement of the valve may be accurately regulated to permit the desired rate of inflow of water and to eliminate undesirable noise in operation.

The section 1 of the casing is provided with a boss 31 formed with an outlet duct 32 having a control valve 33 threaded thereinto and a length of tubing 34 has one end threaded or otherwise secured in a lateral outlet 35 from the duct 32 while the other end is looped to discharge water into the overflow pipe as indicated at 36, the tube being supported above its threaded end by a lug 37.

A valve construction such as defined will be highly efficient in service and the difficulties due to corrosion as experienced in valves at present in use will be eliminated due particularly to the fact that a tapered valve is loosely mounted in a self-guiding tapered valve seat and the provision of the non-corrodible bearings for the rock shaft. Also there will be no corrosion of the valve face since this is preferably of a non-corrodible and expansible material such as rubber which will present a desirable yielding and efficient sealing action over an extensive area represented by the long, tapering valve seat.

It will be further apparent that the valve cannot become dislodged from the recess formed by the seat and will be self-centering, and the self-centering action between the pin 21 and the socketed member 8 of the valve will ensure a uniform or balanced closing pressure on the valve.

While I have shown and described a preferred and specific embodiment of the present invention I may resort to further structural interpretations or adaptations within the essential spirit of the invention.

What I claim as my invention is:

1. A float-controlled valve having in combination, a valve casing having an elongated tapering valve seat, a self-centering elongated tapered valve guided by said valve seat and having an open socket in the top, a float-actuated rock shaft oscillatably journalled in said casing and having an arm extending laterally therefrom within the casing formed with a downwardly facing socket directly above the valve, a pin having a ball-shaped upper end flexibly seated in the arm socket and extending loosely into said valve socket, and means for limiting the valve-opening movement of said arm.

2. A float-controlled valve as claimed in claim 1 in which the means for limiting the valve opening movement of said arm comprises a stop member threaded into said casing in axial alignment with the valve seat for directly engaging said arm to limit the opening movement of the valve, and means for locking said stop member in adjusted relation to the arm.

3. A float-controlled valve of the type having a metal valve casing with a valve therein and a float-oscillated shaft recessed into the casing wall and co-operatively associated with the valve within said casing, characterized in that non-corrodible bearing sleeves are fitted tightly into the casing about the recessed portions of the shaft to insulate the same from metallic contact with the metal casing, said casing being formed of separable sections split in a plane parallelly intersecting the axis of the float shaft and bearing sleeves, and means for clamping said sections together in embracing relation to said non-corrodible bearings, said bearing sleeves having flange portions overlapping the casing wall on the outward side and said float-oscillated shaft being provided with flanges snugly embracing the bearing sleeve flanges on their outward side to axially position the shaft in the casing while preserving the insulated relation between the shaft and casing.

WILLIAM TAYLOR.